United States Patent
Bouffanais et al.

(10) Patent No.: US 10,705,012 B2
(45) Date of Patent: Jul. 7, 2020

(54) DEVICE AND METHOD FOR ANALYSING AND CONTROLLING CELL MOTILITY

(71) Applicants: Singapore University of Technology and Design, Singapore (SG); Massachusetts Institute of Technology, Cambridge, MA (US)

(72) Inventors: Roland Bouffanais, Singapore (SG); Xiaoying Zhu, Singapore (SG); Dick K. P. Yue, Cambridge, MA (US)

( * ) Notice: Subject to any disclaimer, the term of this patent is extended or adjusted under 35 U.S.C. 154(b) by 0 days.

(21) Appl. No.: 15/568,427

(22) PCT Filed: Apr. 22, 2016

(86) PCT No.: PCT/SG2016/050191
§ 371 (c)(1),
(2) Date: Oct. 20, 2017

(87) PCT Pub. No.: WO2016/171626
PCT Pub. Date: Oct. 27, 2016

(65) Prior Publication Data
US 2018/0143125 A1    May 24, 2018

Related U.S. Application Data

(60) Provisional application No. 62/151,530, filed on Apr. 23, 2015.

(51) Int. Cl.
*B01L 3/00* (2006.01)
*G01N 15/00* (2006.01)
(Continued)

(52) U.S. Cl.
CPC ..... *G01N 15/1484* (2013.01); *G01N 15/1404* (2013.01); *G01N 15/1429* (2013.01);
(Continued)

(58) Field of Classification Search
CPC ....... C12M 41/30; C12M 41/00; C12M 41/32
See application file for complete search history.

(56) References Cited

U.S. PATENT DOCUMENTS

6,632,619 B1 * 10/2003 Harrison ............ B01J 19/0093
422/504
2004/0142411 A1 * 7/2004 Kirk ...................... B01L 3/5025
435/33
(Continued)

FOREIGN PATENT DOCUMENTS

WO    2009126524 A2    10/2009

OTHER PUBLICATIONS

Zhu, X. et al. "Persistent Cellular Motion Control and Trapping Using Mechanotactic Signaling" PLoS ONE, 2014, vol. 9, e105406.
(Continued)

*Primary Examiner* — Nathan A Bowers
(74) *Attorney, Agent, or Firm* — Faegre Drinker Biddle & Reath LLP

(57) ABSTRACT

The invention is related to a device and method for analysing and controlling cell motility. In accordance with an aspect of the present invention, there if provided a microfluidic device for analyzing and controlling the motility of a cell, the device comprising: (a) a first inlet for introducing a cell sample; (b) an outlet for discharging the cell sample; (c) a microfluidic channel in fluid communication with and intermediate the first inlet and outlet; (d) a first pump coupled to the first inlet for pumping the cell sample in the microfluidic channel; and (d) an observation area within a portion of the microfluidic channel for analysing and controlling the motility of the cell, wherein the first pump generates a shear stress in the observation area, the shear stress generates a shearotactical signal for driving movement of the cell.

8 Claims, 11 Drawing Sheets

(51) Int. Cl.
    C12M 3/00      (2006.01)
    G01N 15/14     (2006.01)
    G01N 15/10     (2006.01)
(52) U.S. Cl.
    CPC ..... *G01N 15/1459* (2013.01); *G01N 15/1463* (2013.01); *G01N 2015/1006* (2013.01); *G01N 2015/1075* (2013.01); *G01N 2015/1488* (2013.01)

(56) References Cited

U.S. PATENT DOCUMENTS

| | | | |
|---|---|---|---|
| 2010/0240086 A1* | 9/2010 | Kashanin | B01L 3/502753 435/29 |
| 2011/0044865 A1* | 2/2011 | Groisman | B01L 9/527 422/503 |
| 2011/0159522 A1* | 6/2011 | Kamm | C12Q 1/02 435/7.21 |
| 2013/0183660 A1* | 7/2013 | Yu | A61B 5/00 435/5 |
| 2014/0057311 A1* | 2/2014 | Kamm | B01L 3/502753 435/29 |
| 2014/0248698 A1* | 9/2014 | Kotera | C12N 5/0696 435/366 |

OTHER PUBLICATIONS

Lusche, D.F. et al. "The [plA $Ca^{2+}$ channel of Dictyostelium discoideum is necessary for chemotaxis mediated through $Ca^{2+}$, but not through cAMP, and has a fundamental role in natural aggregation" Journal of Cell Science, 2012, vol. 125, pp. 1770-1783.

Sherer, A. et al. "$Ca^{2+}$ chemotaxis in Dictyostelium discoideum," Journal of Cell Science, 2010, vol. 123, pp. 3756-3767.

Guasto, J.S. et al. "Chemotactic Maneuverability of Sperm," 2011, arXiv:11110.2835v1[physics.flu-dyn]. Downloaded from https://arxiv.org/pdf/1110.2835.

Guasto, J.S. et al. "Chemotactic Maneuverability of Sperm in Shear," American Physical Society, 64th Annual Meeting of the APS Division of Fluid Dynamics, Nov. 21-22, 2011, abstract #L29.007. Downloaded from http://adsabs.harvard.edu/abs/2011APS..DFDL29007G.

Calt, M.A. et al. "Design proposal for a microfluidic device for sprouting angiogenesis,"2012 38th Annual Northeast Bioengineering Conference (NEBEC) pp. 333-334, DI: 10.1109/NEBEC.2012.6207100.

Cheng, S. Y. et al. "A hydrogel-based mircrofluidic device for th studies of directed cell migration," Lab on a Chip, 2007, vol. 7, pp. 763-769.

Dong, C. et al. "In Vitro Characterization and Micromechanics of Tumor Cell Chemotactic Protrusion, Locomotion and Extravasation," Annals of Biomedical Engineering, 2002, vol. 30, pp. 344-355. NIH Public Access Author Manuscript viewed (26 pp).

Kwasny, D. et al. "Microfluidic device to study cell transmigration under physiological shear stress conditions" Biomedical Microdevices, 2011, vol. 13, pp. 899-907.

International Search Report for PCT/SG2016/05191, ISA/AU, completed Jun. 29, 2016.

* cited by examiner (a) experimental set-up (b) channel (c) zoom in of the observation area A in (a)

DEVICE AND METHOD FOR ANALYSING AND CONTROLLING CELL MOTILITY

FIELD OF THE INVENTION

This invention is related to a device and method for analysing and controlling cell motility.

Amoeboid motility is a fast mode of cellular migration used by mammalian cells such as neutrophils and some metastatic cells to enter and translocate through various tissues and organs without tightly adhering to specific substrates[1,2]. The molecular mechanisms underlying the migration of such highly-motile cells have been extensively studied in the past decades[3], revealing complex physically-integrated molecular processes involving biochemical cascades intercorrelated with external chemo- and mechanostimuli[4]. Many of these studies involved the use of the lower eukaryotic amoeba *Dictyostelium discoideum*[5] (Dd), a model organism easily amenable to genetic analysis and sharing many motile characteristics with neutrophils, lymphocytes, and some tumor cells, including chemotactic behaviors[1,6] and mechanotactic ones[7-10]. As an haptokinetic process, amoeboid crawling requires appropriate adhesion to the substratum so that traction can be gained, and such that the cell can move forward. With sufficient adhesion, amoeboid movement occurs from alternating cycles of cytoskeletal expansion and myosin driven retraction leading to shape changes in the form of pseudopod[1] or in the form of the relatively overlooked leading-edge bleb formation[11].

Cellular adhesion, much like motility, is a complex, dynamic and highly-regulated process. Dynamic and coordinated changes in the actin-myosin cytoskeleton with actin polymerization at the leading edge provide the driving force for extension, and contractile forces allows the detachment and retraction of the rear end[12,13]. Cell-substrate adhesion is an active process since cells are not adhesive per se. Indeed, its regulation is critical for effective cell migration. For the social amoebae Dd, a clear and detailed picture of the mechanisms and structures underlying cell-substratum adhesion is still lacking, although some progress has been reported over the past decade.

According to Uchida and Yumura[14], *Dictyostelium*'s adhesion to the substratum stems from actin foci. These very dynamic structures have been found to be the sites where traction forces are transmitted to the substrate, and thus have been proposed as likely candidates for *Dictyostelium* feet. Unlike mammalian cells, *Dictyostelium* cells are unable to form integrin-mediated focal adhesions since they lack genes encoding integrin homologs[15]. However, several other transmembrane proteins have been identified to mediate adhesion in Dd—among others SibA, SibC, Phg1, Phg2, and SadA—in different growth phases and with specific substrate types[16-19]. Recently, Loomis et al.[20] also considered the possible involvement of innate nonspecific cell-substratum adhesions, which were shown to play an important role. The exact role of cell-substrate adhesion on *Dictyostelium*'s motility is still debated although it is well accepted that both processes are clearly interwoven[21]. For instance, cell-substratum adhesion strength—known to be around 1 Pa for *Dictyostelium* cells[4]—has a marked biphasic effect on migration speed[1]. Hence, the effectiveness of the haptokinetic migration of amoeboid cells requires a fine balance between adhesion and de-adhesion rates. A too weak adhesion to the substrate eventually results in a loss of contact with the substrate therefore preventing active directional migration. On the other hand, a too high adhesion to the substrate yields a speed reduction as de-adhesions at the rear end are impeded. Beyond the apparent interplay between adhesion and amoeboid motility, it is important to highlight the central role played by mechanosensitivity in both of these cellular processes. Recent studies indicate that mechanical forces have a far greater impact on cell structure and function than previously appreciated[22]. For instance, eukaryotic cells such as epithelial cells[23], amoebae[7,8,24], and neutrophils[10], are remarkably sensitive to shear flow direction. In the particular framework of our study, the interwoven processes of migration and adhesion is noteworthy among the many cellular processes regulated by physical forces.

Recent studies have established that at the adhesion sites—where the transmembrane protein receptors form bridges with the substratum, cells can not only sense the chemical features of the substrate, but also a wide range of mechanical cues[25,26]. This includes fluid flows and shear stresses, deformations of elastic or solid materials, and a complex transfer loads between the various interacting components of the cell itself and its surrounding environment[27]. It is worth adding that adhesion-mediated mechanosensitivity allows cells to probe two physical aspects of their environment, namely force and geometry at the nano-to-micrometer level[28], with an effectiveness that depends on the adequate functioning of the mechanosensors as well as the chemical nature of the underlying substrate. For instance, some cells are able to display a durotactic motile behavior during which migration is oriented along the gradient of the rigidity of the substrate[29]. More recently, mechanical cell trapping has been achieved using specific 3D-microstructured surfaces[30] and fluid shear stress[8]. These results underscore the fact that a fine control of the physicochemical features of the microenvironment[27,31-33] should open new avenues for cell control and manipulation[34-36], hence paving the way for innovative applications in biotechnology and regenerative medicine.

The mechanisms underlying the conversion of mechanical signals at the adhesion sites into intracellular chemical signals are still largely obscure. A host of molecular sensors have been shown to be involved in the process of mechanotransduction, including G protein-coupled receptors in neutrophils subjected to fluid shear stress[9]. However, mechanosensitive ion channels (MSCs) are among the most efficient mechanosensors and also the fastest acting[37]. They form a special group of mechanosensors that also serve the role of effectors through the mediation of a flux of specific cations, such as $Ca^{2+}$, across the cellular membrane. The physical limits on cellular directional mechanosensing have been theoretically investigated in the particular case of stretch-activated MSCs[38], for which the stimulus mechanically deforms the membrane's lipid bilayer, in turn triggering protein conformational changes from a closed state to an open one[39]. The existence of calcium-based stretch-activated MSCs in Dd was first revealed by Lombardi et al.[40]. Very recently, Lima et al.[41] established that the calcium-based MSC PKD2 is the major player in *Dictyostelium*'s shearotactic (i.e. mechanotactic and with the mechanical signal being a fluid shear stress) response[7,8], improved by calcium mobilization[24]. Indeed, PKD2 is a transmembrane protein that allows calcium influxes in response to mechanical stress or extracellular calcium changes[41]. This recent discovery sheds a new light on a host of results underscoring the pivotal role played by soluble calcium on some specific behaviors of Dd. For instance, the extracellular $Ca^{2+}$ has been shown to be a key parameter in the random motile behavior of aggregation competent cells[42], while also enhancing chemotactic efficiency[43]. Moreover, soluble calcium affects the shearotactic prowess of vegetative cells[8,24].

Very recently, it was uncovered the existence of an optimal level of extracellular calcium of 3 mM at which both speed and directionality of shearotactically-driven vegetative Dd cells are maximum[8]. Interestingly, this optimal value is very close to levels of soluble calcium commonly found in soil solutions[42].

The interplay between amoeboid motility, cell-substratum adhesion and mechanosensitivity has so far been investigated only through a reductionist "paired approach", namely: (i) motility vs. adhesion[1,2,14,21], (ii) motility vs. mechanosensitivity[7,8,10,29-33,40,44], and (iii) adhesion vs. mechanosensitivity[9,25-27]. The recent discovery of PKD2 as the primary calcium-based mechanosensor in Dd[41] combined with the mounting evidence of the important effects of extracellular calcium on both migration[8,24,40,42] and cell-substrate adhesion[42] suggest an intricate triadic coupling between migration, adhesion and mechanosensation. Here, the present invention presents the first investigation of this triadic coupling through a quantitative assessment of the interplay between cellular migration and adhesion using a carefully-controlled mechanotactic signal in the form of fluid shear stress. Specifically, Dd cells are placed within a microfluidic cell system that allows the application of stable temporally-controlled shear stresses. This system permits direct visualization of transient responses of multiply seeded cells. Within this well-controlled in vitro environment, multiple independent single-cell tracking can simultaneously be achieved, allowing quantitative statistical characterizations of the shearotactically-driven migration to be obtained. The appropriate selection of a low mechanotactic signal shear stress ($\sigma \approx 0.2$ Pa) and the optimal calcium concentration of 3 mM led to substantially enhanced directed migratory responses in terms of both speed and directionality compared to prior studies[7,24]. However, one important element was lacking in previous work for optimal conditions to mechanotactically and chemo-mechanotactically (i.e. by means of a combined mechanotactic and chemotactic signal) drive Dd cells[8], namely the influence of the nature of the underlying substratum.

In principle, the present invention can be applied to exhaustively quantify, in terms of the directed crawling of Dd cells and the associated adhesion, substrates with (widely) different physical and chemical properties. As proof of concept, we investigate and show how the effectiveness of mechanosensation and chemo-mechanosensation over selected different substrates influences directed migration and cell-substrate adhesion. Our results establish the central role played by mechanosensation in allowing the cell to actively select the appropriate level of adhesion resulting in the most effective directed migration possible. Specifically, we show that the directed and controlled migration of vegetative Dd cells is optimal—in terms of speed and directionality—at the same level of extracellular calcium of 3 mM, for three substrates considered (with vastly different hydrophobicities and hardness), with qualitative differences among these substrates amplified in the vicinity of this level. Coincidentally (but not surprisingly), the measure of cellular adhesion—based on the remaining fraction of a cell population subjected to a given magnitude of shear stress for a fixed duration—is found to be minimal near the same optimal level of soluble calcium of 3 mM, for all the substrates considered, again with qualitative differences among them in the adhesion measure. Finally, when cellular mechanosensation is knocked out—by blocking most stretch-activated MSCs, including the identified PKD2, using a sufficient amount of gadolinium ($Gd^{3+}$)—no active reduction in substrate adhesion is achieved leading to the same undifferentiated and drastically-reduced level of directed migration.

Overall, these results reveal and detail for the first time the pivotal role played by mechanosensation in controlling the interplay between directed migration and cell-substrate adhesion. This fact could potentially lead to innovative applications in the field of tissue engineering and regenerative medicine if proven to be effective with mammalian cells. For instance, such responses and control of cell motility to various mechano- and chemostimuli might open new possibilities for cell sorting in surface and mechanically controlled assays[32,33]. Moreover, these mechanobiological results suggest and could form the basis of novel means of quantifying differences among surfaces with (minor) variations in physicochemical properties. Specifically, one could use a population of mechanosensitive and shearotactically-guidable cells to mechanotactically "probe" these different surfaces and to differentiate their physicochemical properties based on the cellular response to induced directed migration.

In accordance with an aspect of the present invention, there if provided a microfluidic device for analyzing and controlling the motility of a cell, the device comprising: (a) a first inlet for introducing a cell sample; (b) an outlet for discharging the cell sample; (c) a microfluidic channel in fluid communication with and intermediate the first inlet and outlet; (d) a first pump coupled to the first inlet for pumping the cell sample in the microfluidic channel; and (d) an observation area within a portion of the microfluidic channel for analysing and controlling the motility of the cell, wherein the first pump generates a shear stress in the observation area, the shear stress generates a shearotactical signal for driving movement of the cell. By "analysing", it includes any form of observation.

Preferably, the microfluidic device further comprises a second inlet for introducing a chemoattractant into the microfluidic channel to generate a chemotactic gradient across the observation area. More preferably, the chemotactic gradient is perpendicular to the direction of the flow of the cell sample in the microfluidic channel.

Advantageously, the observation area is subjected to a shearotactical or combined chemo-shearotactical signal to analyse, control and/or determine motility and/or direction of motility of a cell.

Preferably, the microfluidic device further comprises a second pump coupled to the second inlet for generating the chemotactic gradient.

Preferably, the chemoattractant is a cyclic adenosine monophosphate (cAMP). The concentration of cAMP introduced in one of the inlets is between 10 to 100 μm. Alternatively, any other suitable chemoattractants or chemorepellents may be used, e.g. N-formyl-methionine-leucine-phenylalanine.

In an embodiment, the microfluidic device further comprises a third inlet for introducing the cell sample. Preferably, the rate of flow of the cell sample in the first and third inlets are constant. The flow rate of the chemoattractant is independent of the flow rates of the cell samples.

Preferably, the observation area further comprising an image capturing device and a cell tracking device for live cell ensemble imaging. The cell tracking device includes an operating programme adapted to be executed on a machine to cause the machine to analyse the motility of a cell.

By "shear flow", it is meant to include any flow containing tangential shearing stresses (force per unit area) within the microfluidic channel, and/or the flow that is induced by a force in the fluid sample (for example, a force provided by the pump). The fluid sample may be of any suitable density in order to arrive at a suitable shear flow of the present invention. The shear stress generated by the shear flow may be of any suitable magnitude. In addition, the shear flow may include varying the magnitude of the shear stress when introducing the cell sample through the device. Preferably, the shear stress is between 0 to 1 Pa.

Preferably, the first and second pumps are syringe pumps.

Preferably, the shearotactical signal is fluid shear stress generated by the pump.

Preferably, the combined chemo-shearotactical signal is the superimposition of a shearotactical signal generated by one pump with a chemotactic signal generated by the creation of spatial of gradient of cAMP by another distinct pump.

Preferably, the observation area further comprises a light source.

Preferably, the cell tracking device includes an operating programme adapted to be executed on a machine to cause the machine to analyse and control cell motility.

Preferably, the observation area is 1 mm$^2$.

Preferably, the device is optically transparent.

Preferably, the device is formed from a hydrophobic material. Preferably, the device is formed from plastic. Alternatively, the device may be formed from glass.

Preferably, the device comprising a plurality of microfluidic channels, each microfluidic channel comprising at least one inlet and an outlet.

In accordance with another aspect of the present invention, there is provided a method to detect, analyse and control the motility of a cell, the method comprising: (a) introducing an isolated cell population on a substrate surface; (c) contacting the cell population with a shearotactic signal; and (d) determining whether the cell is motile after contact with the shearotactic signal. Preferably, the method determines whether the cell is following the prescribed motile behaviour, such behaviour is described in detail below.

Preferably, the method further comprises introducing a chemoattractant to the cell population to generate a chemotactic gradient across the substrate surface. In an embodiment, the chemoattractant is a cyclic adenosine monophosphate (cAMP). The concentration of cAMP may be between 10 to 100 μm.

Advantageously, the cell population may be contacted with a shearotactical and/or a combine chemo-shearotactical signal. The shearotactical signal is fluid shear stress generated by a pump that introduces the isolated cell population. Preferably, the shear stress is between 0 to 1 Pa.

Preferably, the cell population is prepared in a buffer comprising calcium ions. In an embodiment, the calcium ions are $Ca^{2+}$.

Preferably, the concentration of calcium ions in the buffer is 3 mM.

Preferably, the pH of the buffer is 6.2.

Preferably, the method further comprising determining the direction of movement of the cell.

Preferably, the cell is an amoeboid cell.

In accordance with another aspect of the present invention, there is provided a composition for inducing cell migration comprising calcium ions, wherein the concentration of calcium ions present in the composition is 3 mM.

In order that the present invention may be fully understood and readily put into practical effect, there shall now be described by way of non-limitative examples only preferred embodiments of the present invention, the description being with reference to the accompanying illustrative figures.

In the Figures:

FIG. 1 is a schematic diagram of a microfluidic device according to an embodiment of the present invention;

FIGS. 2A, B and C are charts showing optimal value of calcium concentration with regard to both average cell speed and shearotactic efficiency;

FIGS. 3A and B are charts showing the direction migration of cells in response to a shearotactic signal;

FIGS. 4A and B are charts showing the direction migration of cells in response to a shearotactic signal;

Figure 10:
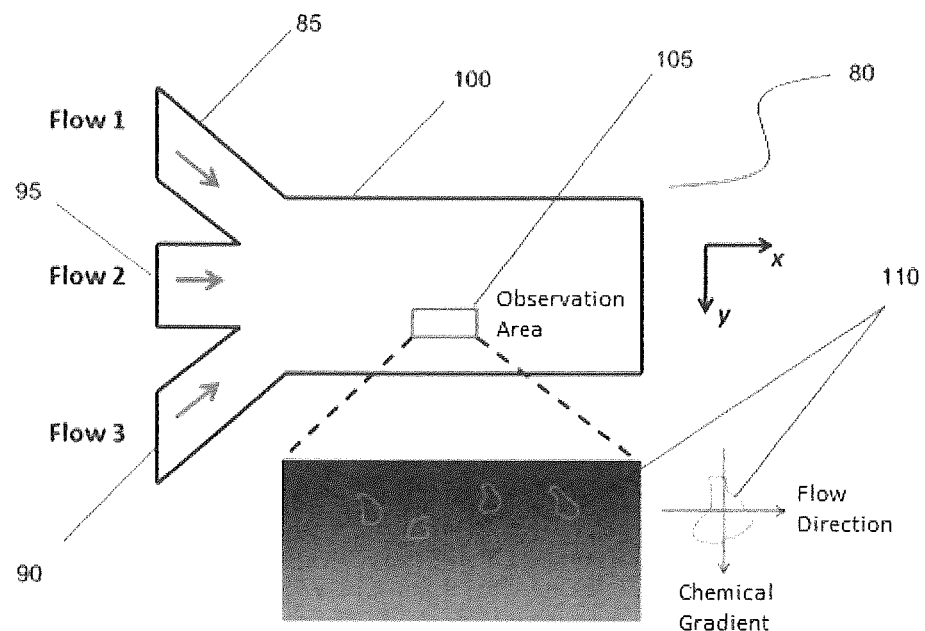
Figure 10:
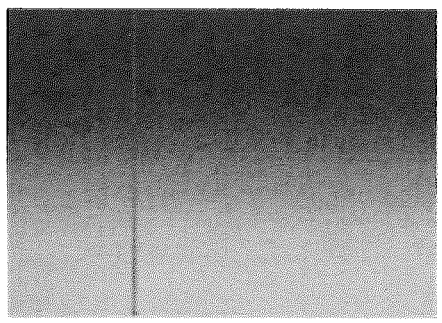
Figure 10:
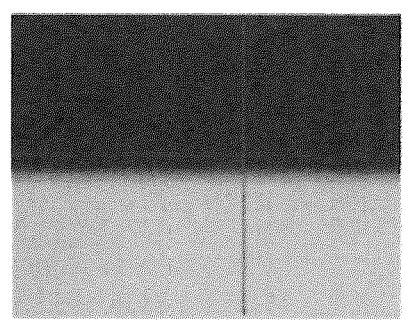
Figure 10:
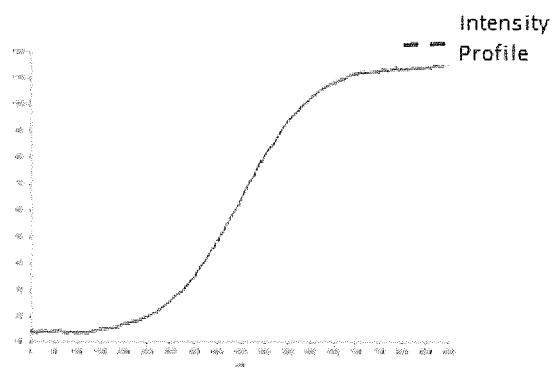
Figure 10:
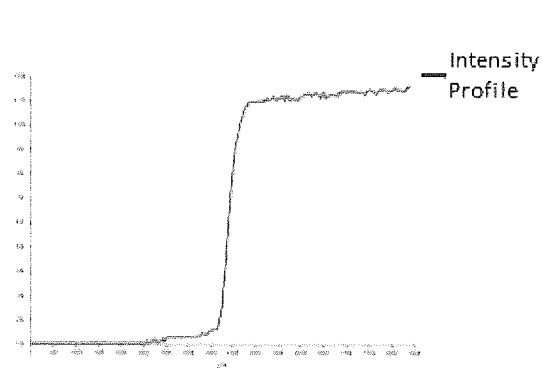
Figure 11A:
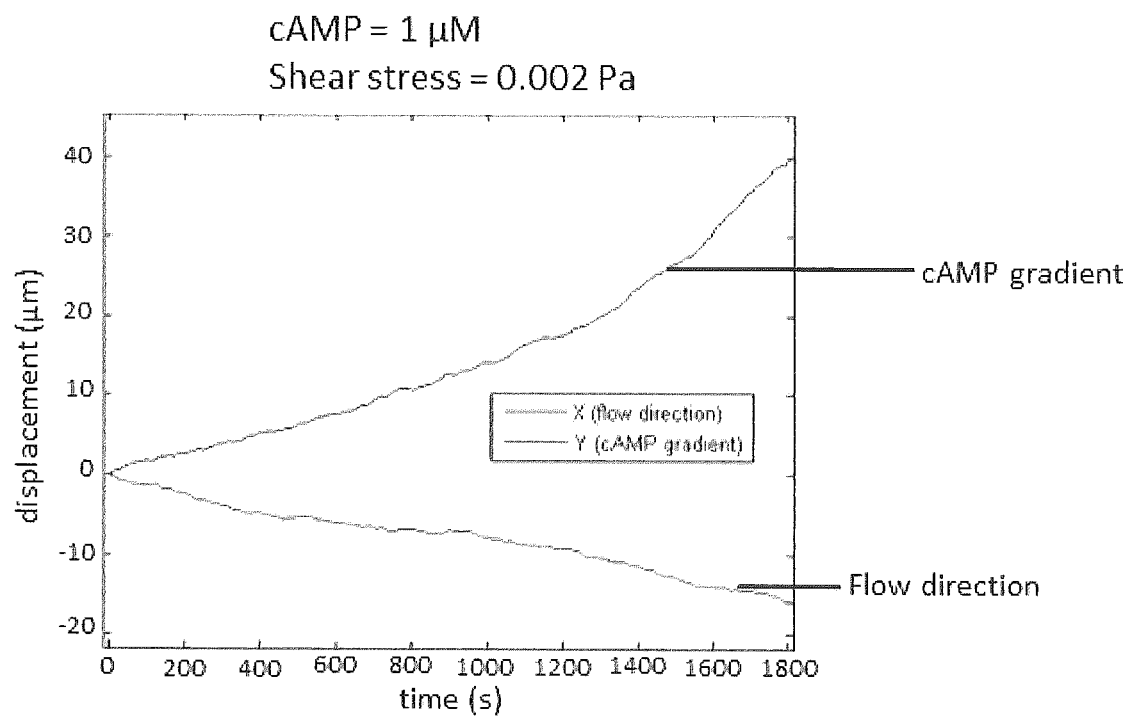

FIG. 10 shows a general schematic drawing of the microfluidic device used to investigate the effects of combined chemo-mechanotactical signal on the controllability of cell migration according to an embodiment of the present invention; and FIGS. 11(a) and (b) show average cell trajectories in x and y directions, and reveal a profound nonlinear coupling between the chemotactic signal and the shearotactical one.

EXAMPLE

1. Materials and Methods

Cell Growth and Preparation

Wild-type *Dictyostelium discoideum* AX2 cells (strain obtained from DictyBase; Depositor: Wolfgang Nellen) were grown at 23° C. in axenic medium (HL5) on petri dishes[45].

Vegetative cells were harvested during the exponential growth phase with a density not exceeding $1 \times 10^6$ cells/mL, pelleted by centrifugation (1000 g, 4 minutes). Cells were then washed twice with MES-Na buffer (20 mM morpholinoethanesulfonic acid, adjusted to pH 6.2 with NaOH) and used immediately. For all experiments involving the blocking of stretch-activated MSCs, gadolinium hydrochloride III ($Gd^{3+}$) with concentrations ranging from 1 μM to 100 μM was added to the MES-Na buffer. To avoid any damage to cells due to even moderate exposure to light, each sample was used for less than 40 minutes.

Cell Motility Device Design

Figure 9:
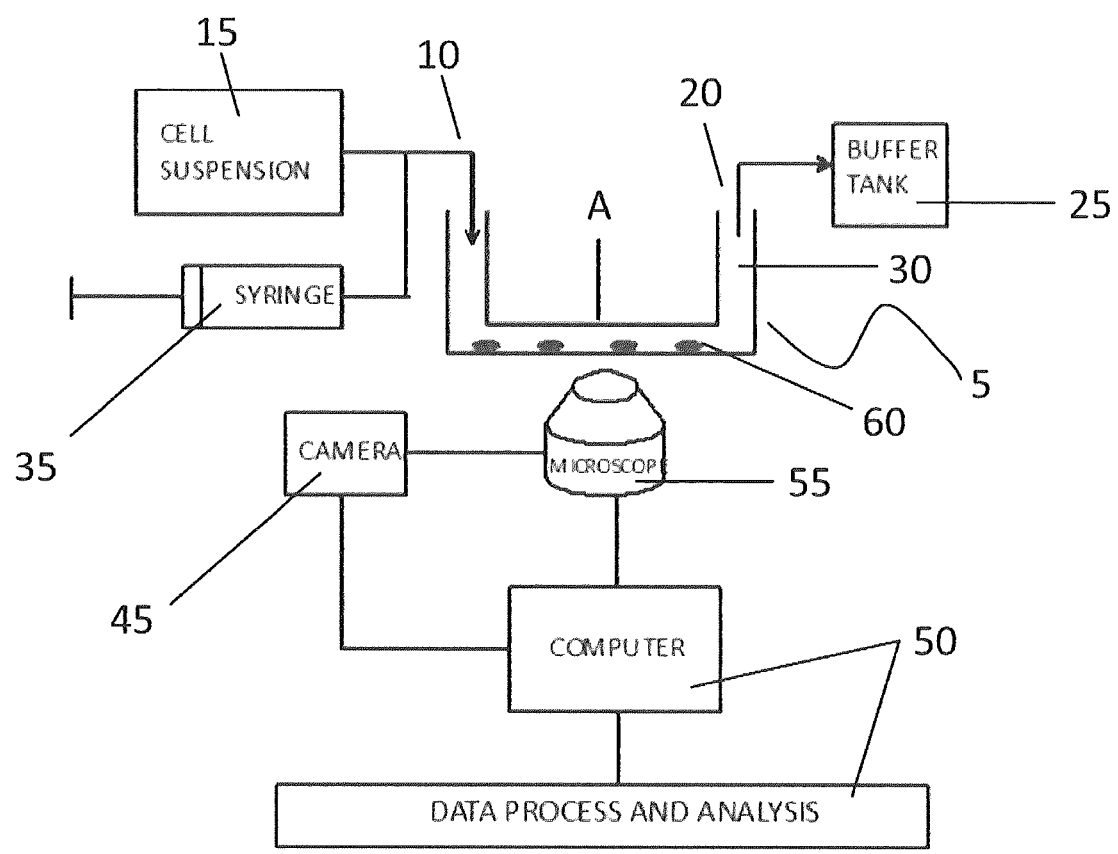
FIG. 9 shows a device according to an embodiment of the present invention.

FIG. 9 shows a general schematic drawing of the microfluidic device used to investigate the effects of shearotactic signals on the controllability of cell migration and cell-substrate adhesion according to an embodiment of the present invention.

With reference to FIG. 9, the microfluidic device 5 includes an inlet 10 for receiving a cell sample from a cell suspension source 15, and an outlet 20 for discharging the cell sample. The cell sample may be discharged into a buffer tank 25. Within the microfluidic device 5 is a microfluidic channel 30 in fluid communication with and intermediate the inlet 10 and outlet 20. The microfluidic channel 30 is formed in the substrate of the device 5. The substrate may be made of any suitable material as will be described in greater detail below. A syringe pump 35 pumps the cell sample through the microfluidic channel 30. Apart from a syringe pump 35, any suitable pump may be used to provide flow of the cell sample through the microfluidic channel 30 and also provide a shearotactical signal in the form of a fluid shear stress in an observation area A within a portion of the microfluidic channel 30. The level of shear stress is directly related to the volume flow rate of the pump. The shearotactic signal can be controlled precisely through flow rate generated by the syringe pump. Alternatively, a chemical gradient may be generated. In order to achieve such a chemical gradient, another type of microfluidic channel configuration is used. In this embodiment, a microfluidic channel is in fluid communication with 3 inlets and 1 outlet. In addition, to generate a chemical gradient, 3 individual separate syringe pumps will have to be used—one for each inlet. Except for the microfluidic channel and syringe pump configuration, the rest of the configuration of the device remains the same as that for generating shear flow force. The dimensions of the microfluidic channel 30 may be chosen to accommodate appropriate shear stress levels. For example, shear stress may be controlled in the 0 to 1 Pa range. The observation area A may be located anywhere along the length of the microchannel 30 and further comprising an image capturing device 45 and a cell tracking device 50 that are external to the device and for analysing cell motility of the cells within the observation area 40 of the microfluidic channel 30. The cell tracking device 50 may include an operating programme adapted to be executed on a machine to cause the machine to analyse cell motility. The image capturing device 45 may include a light source and a microscope 55 for capturing clear images of the cells.

FIG. 10 shows a general schematic drawing of the microfluidic device according to another embodiment of the present invention. In particular, the device shown in FIG. 10 is used to investigate the effects of combined chemo-mechanotactical signal on the controllability of cell migration according to an embodiment of the present invention. With reference to FIG. 10, the microfluidic device 80 comprises a first inlet 85 (Flow 1), a second inlet 90 (Flow 3) and a third inlet 95 (Flow 2). All three inlets converge at a junction that is in fluid communication with a microfluidic channel 100. The microfluidic channel 100 includes an observation area 105 for observing the motility of a cell in a fluid cell population sample. In this embodiment, cell sample (containing cells 110) is introduced into the microfluidic device via first inlet 85. This cell sample may be prepared and contained in a buffer comprising calcium ions—which will be described in detail later. The second inlet 90 introduces a chemoattractant into the microfluidic channel to generate a chemotactic gradient across the observation area 105. In an embodiment, the chemoattractant is cAMP at a concentration of 10 μm. The second inlet 90 may be coupled to a pump that will pump the chemoattractant into the microfluidic device 80. From FIG. 10, it can be seen that the flow direction points the positive x-axis, while the chemoattractant direction is perpendicular to the flow direction, i.e. along the positive y-axis. As such, the chemotactic gradient in the observation area 105 is perpendicular to the direction of the flow of the cell sample in the microfluidic channel 100. Chemotactic stimulus leads to directed cell migration of the cells in gradient direction to the bottom. The observation area is rigorously calculated through fluorescence calibration. FIG. 10 also shows fluorescence image calibration of $C_{20}H_{10}Na_2O_5$, used as an indicator for the concentration distribution of the chemoattractant gradient field. The molecular weight of $C_{20}H_{10}Na_2O_5$ is comparable with that of the cAMP molecule.

A third inlet 95 may introduce a cell sample and the rate of flow in both first and third inlets (85, 95) is constant.

Figure 1:
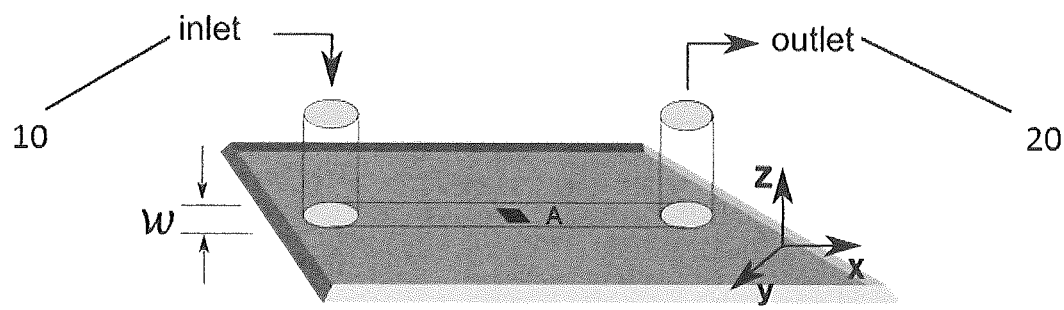
Figure 1:
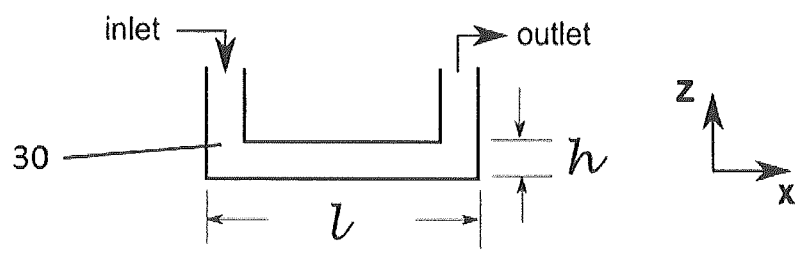
Figure 1:
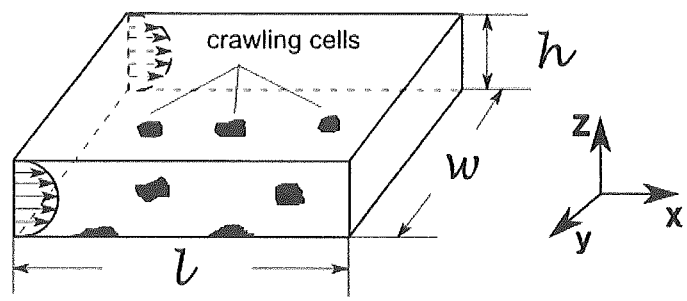

FIG. 1 shows a different perspective view of the microfluidic device 5 shown in FIG. 9. In FIG. 1, the external flow circuit comprising the syringe pump is not represented but is connected to the inlet and outlet of the microfluidic channel. Different values for the channel height h, width w and length l were considered depending on the type of channel and nature of the bottom substrate.

Shearotactic cell motility assays were conducted in an optically transparent flow chamber (FIG. 1) as such that of the microfluidic device 5 shown in FIG. 9 in which both the magnitude and direction of the shear stress are uniform throughout the (yx)-surface of the observation area A located at the center of the microfluidic channel (FIG. 1), and temporally controlled using an external flow circuit connected to a syringe pump having a highly controllable flow rate. Vegetative Dd cells adherent to the bottom surface of the observation area A (FIG. 1) are subjected to an externally controlled shearotactic signal of very small magnitude. In the present assay, amoeboid cells such as Dd are used and they naturally adhere to the substratum onto which they are crawling—this mechanism is instrumental for them to gain traction and then migrate. As such, as shown in FIG. 9, the cells 60 adhere to the bottom of the microfluidic channel 30 and their motility is observed in the observation area A. The distance the cells travel may be small compared to the size of the observation area A. The incubation time for allowing the cells to adhere to the substratum in the observation area A may be between 5 to 10 minutes. Their migratory responses are tracked by recording the cell trajectories, typically over a duration of 10 to 20 minutes, during which some cells travel over 8 to 16 times their body length—measured to be on average 14 μm for the cell strain we considered.

Cell tracking experiments were carried out at ambient temperature (23° C.) under a Nikon Eclipse Ti-S phase contrast microscope equipped with 10× and 20× long working distance objectives and a fast camera (Nikon digital sight DS-Ri1) was used to capture the images. Stress is applied through shear flow generated by a syringe pump and the level of shear stress is directly related to the volume flowrate of the pump. Chemical gradient can also be generated using our device. An area of approximately 1 mm² at the center part of each channel was used for measurement. Data acquisition and analysis using the image processing and cell tracking software Image Premier Pro (Media Cybernetics MD) were as described in Ref.[8].

Figure 8:
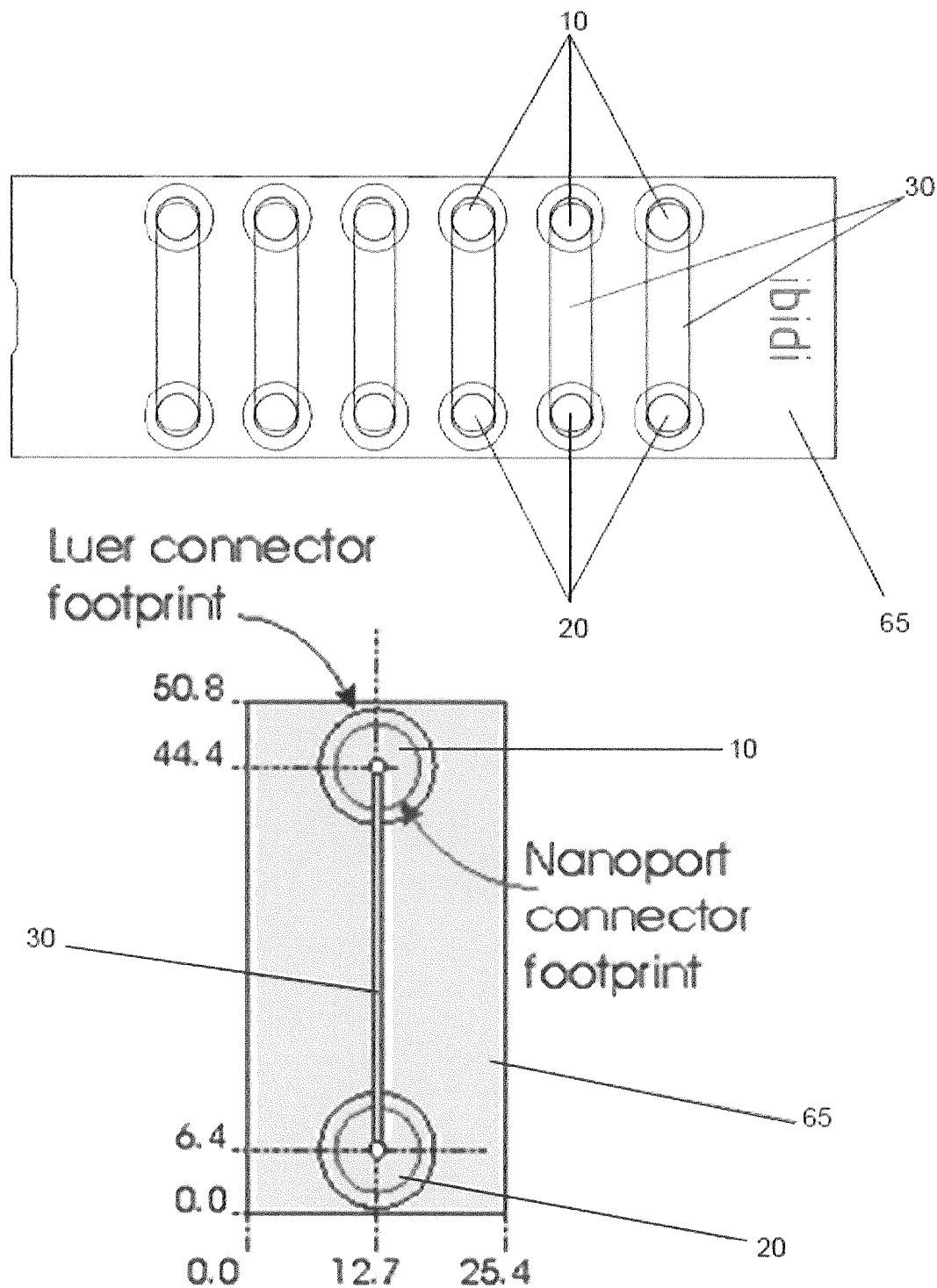
FIG. 8 shows a device according to another embodiment of the present invention.

In another embodiment of the present invention, as shown in FIG. 8, the microfluidic device 5 may be in the form of a slide 65 comprising a plurality of microfluidic channels 30, each microfluidic channel 30 comprising an inlet 10 and an outlet 20.

Shear-Flow Induced Cellular Detachment

Cells were suspended in the MES-Na buffer with different levels of extracellular soluble calcium and injected into different channels. Cells were spread at a density of 100 cells/mm², giving a fraction of surface occupied of 3%, on the bottom surface of the channel and allowed to settle for 10 minutes. Given that the surface coverage of cells is below 7%, hydrodynamic interactions between cells can be neglected[46]. The cells were then subjected to a shear stress of magnitude σ=1 Pa in selected buffers. This choice for the value of σ is based on the reported value for the adhesion strength being around 1 Pa⁴. Video recording was started after cells were exposed to the shear flow for 30 seconds. The remaining fraction of cells was then calculated after a 10-minute exposition to this shear flow.

Substrate Surfaces

The surface of the microfluidic channel 30 that is exposed to the cell sample may be treated to make it either hydrophilic or hydrophobic. These surfaces may be unique properties. By "surface properties", it is meant to include both physical and chemical properties of the substrate, such as hydrophilicity, rigidity, chemical coating, etc. In the example provided, hydrophobic and hydrophilic plastic channel slides (µ-slide VI 0.4 from ibidi) both having a width w=3.8 mm, a height h=0.4 mm, and a length l=17 mm (see FIG. 1) were used. The hydrophilic substrate surface is characterized by a contact angle of 15°, while the hydrophobic one has a contact angle of 100°. These angles are contact angles, which are a quantitative macroscopic measure of the wettability of the surface of the substrate and directly related to the hydrophobic/hydrophilic characters of the surface. A contact angle of 0 degrees means perfect wettability due to a high hydrophilic character and a contact above 90 degrees is characteristic of a hydrophobic surface. Another microfluidic channel considered is a glass channel (purchased from Translume) having a width w=0.3 mm, a height h=0.3 mm, and a length l=38 mm. In this example, three different substrates were used: (a) plastic hydrophilic; (b) plastic hydrophobic; and (c) glass hydrophilic. The rigidity of the plastic and glass channels are characterized by their Young's modulus: approximately 1 GPa for the plastic microchannels from ibidi, and in the 50~90 GPa range for the glass microchannel from Translume. The glass channel was systematically washed with a mild detergent, followed by a concentrated NaOH solution (10 M) for 10 min, and then thoroughly rinsed with ethanol and distilled water, making it hydrophilic.

2. Results and Discussion

Figure 2A:
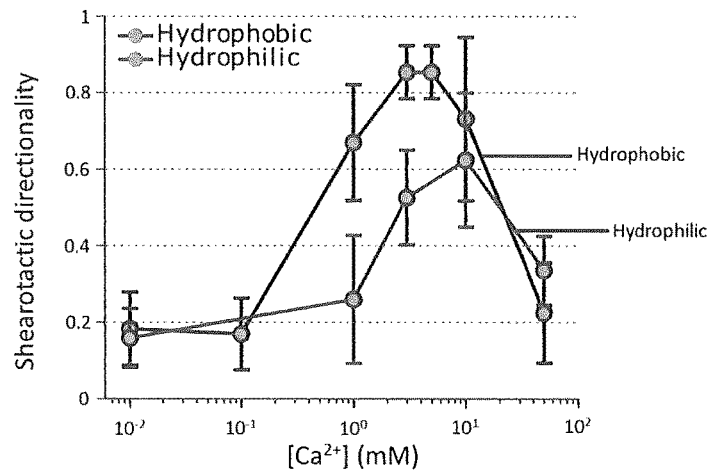
Figure 2B:
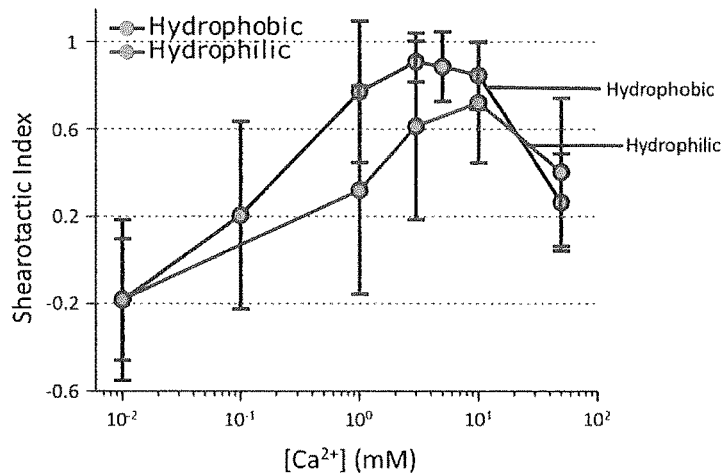

Influence of Extracellular Calcium Level on Shearotactic Cell Guiding and Control A wide range of extracellular calcium concentration from 10 µM to 50 mM were considered for the study of shearotactic guiding of cells crawling on two different plastic substrates with hydrophobic and hydrophilic features (see above). A clear optimal value for the calcium concentration was obtained with regards to both average cell speed and shearotactic efficiency (FIG. 2). Similarly to the study of other taxes, the present invention's measure of the shearotactic efficiency—i.e. the quantitative measure of cell's directional control—comprises two components: (i) the shearotactic directionality ($S_d$) of the cells measured by $\langle \cos \theta_i \rangle$, $\theta_i$ being the angle between the instantaneous cell velocity $v_i$ and the direction of the shear flow, arbitrarily chosen as the positive x-direction, and (ii) the shearotactic index ($S_i$), defined as the ratio of the distance travelled in the direction of the flow to the total length of the cell migration path during the same period. Cells moving randomly have a shearotactic directionality of 0, while cells moving straight along the flow have a directionality of 1; cells moving straight against the flow have a directionality of −1.

Figure 2C:
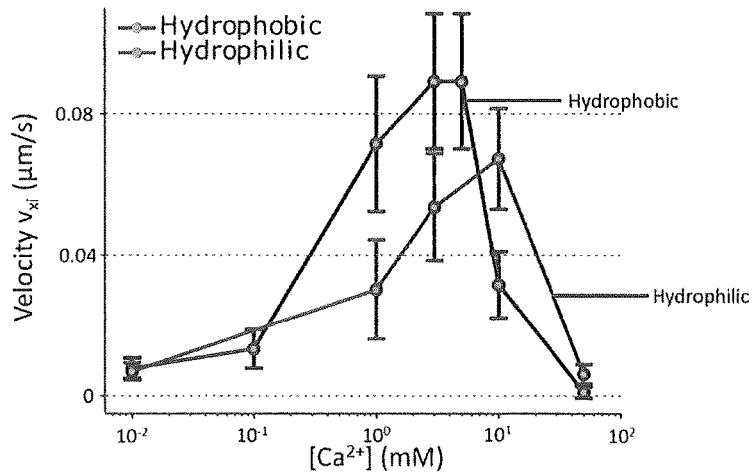
Figure 3A:
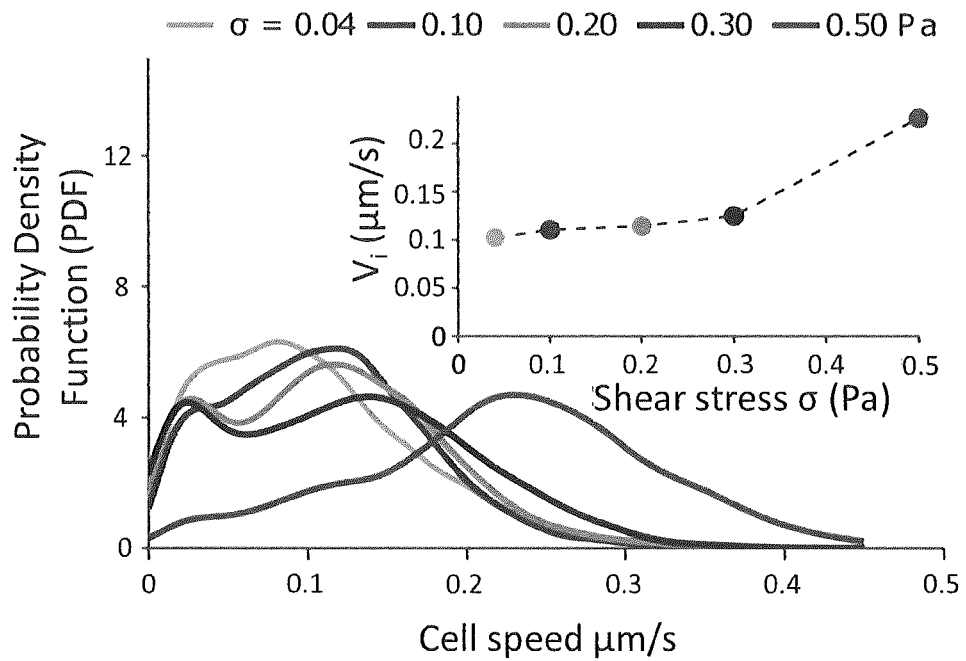
Figure 3B:
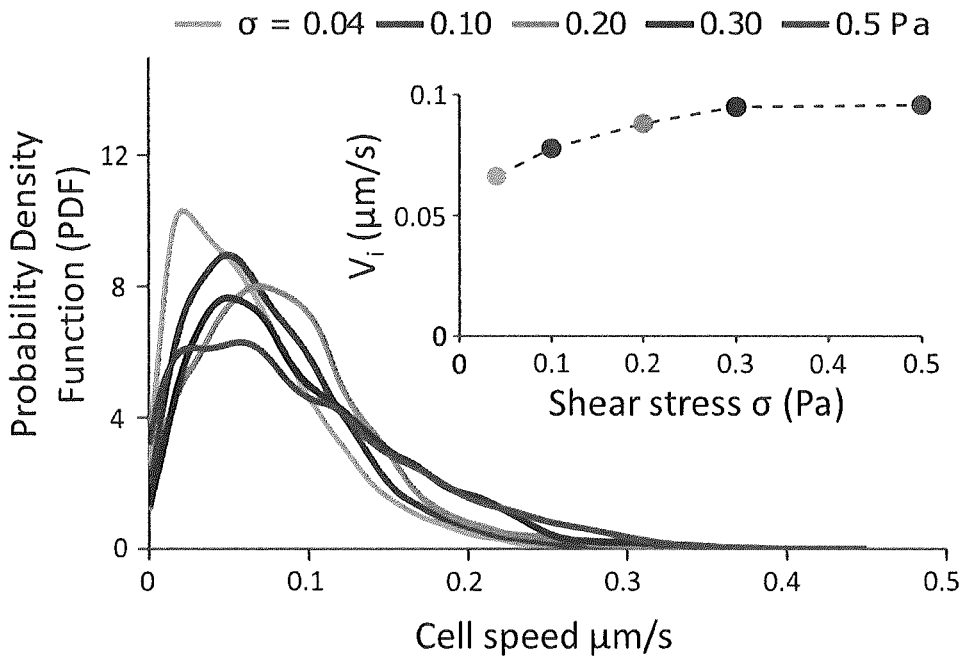
Figure 4A:
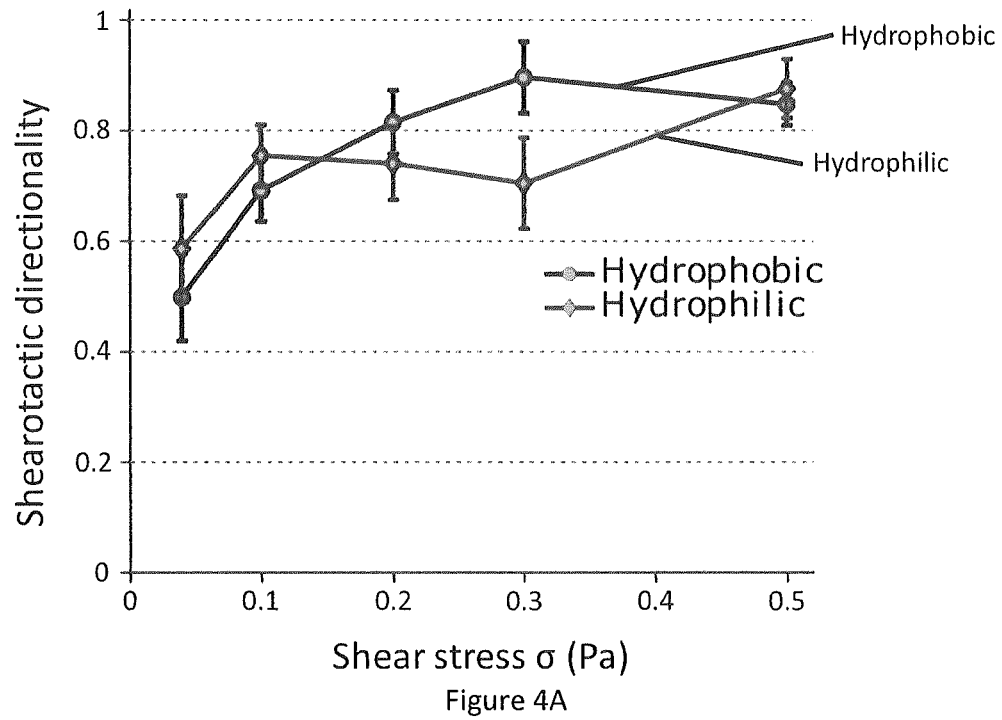
Figure 4B:
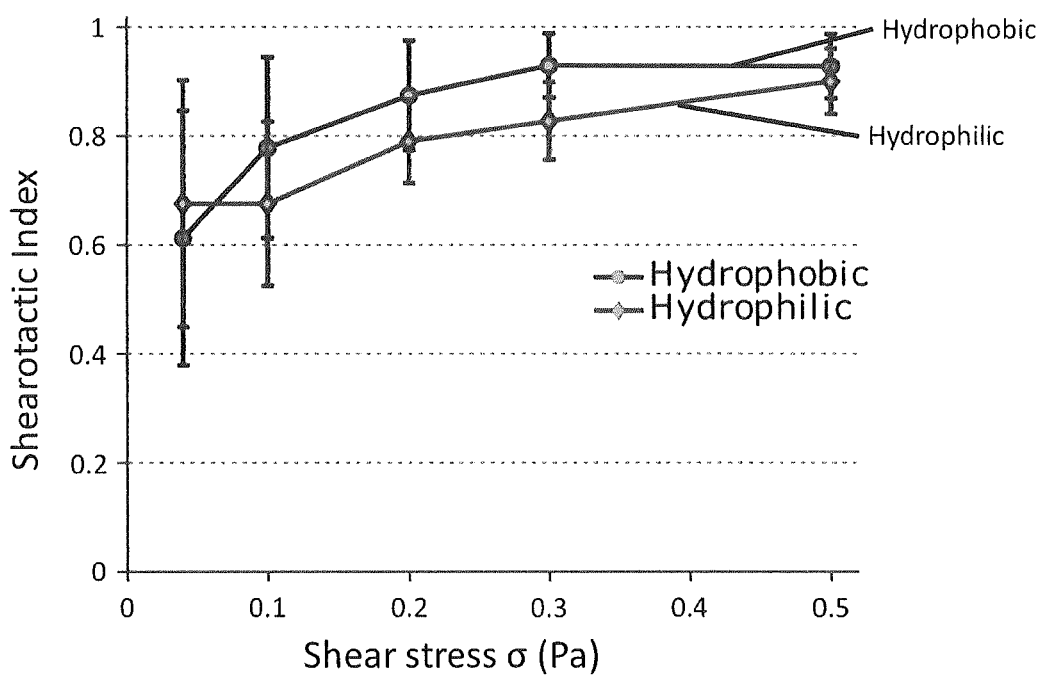

FIG. 2 shows clearly the peak responses in terms of $S_d$, $S_i$ and average in-flow velocity $v_x$ all within a relatively narrow optimal range of $[Ca^{2+}]_{ext}$ for respectively the plastic hydrophobic and plastic hydrophilic substrates: $[Ca^{2+}]_{ext} \simeq 3$ mM for the hydrophobic and $[Ca^{2+}]_{ext} \simeq 10$ mM for the hydrophilic surface. The peak amplitudes are quantitatively distinct between the two surfaces with values for the hydrophobic surface 30% higher for all three measures (Table 1). FIG. 2 corresponds to cells being driven with a shearotactic signal of σ=0.18 Pa. FIG. 3 and FIG. 4 show that the features of directed migration for Dd cells are only very moderately affected by variations of σ around this value—in the 0≤σ≤0.5 Pa range. In particular, the observed quantitative difference in the response on different substrates are consistent across this range of σ, e.g., for the cell speed (FIG. 3) and directionality (FIG. 4). Such low shear stress values are considered for mainly two reasons: (i) to ensure persistence of directed migration associated with an almost negligible occurrence of cell-substrate detachment, and (ii) to reflect the known ability of cells to be driven in vivo by very low shearotactic stimuli[8].

As already noted in Ref.[8], these results associated with the influence of soluble calcium on shearotactic guiding are remarkable as they seem to contradict the assumption of an independent regulation of speed and shearotactic efficiency (measured by shearotactic index and directionality)[24]. This is further confirmed here for cells crawling on a hydrophilic plastic substrate. Moreover, an excess of calcium—beyond 50 mM—totally hinders cellular migration as the speed tends toward zero regardless of the nature of the substrate (FIG. 2C).

TABLE 1

| Substrate | $\langle S_d \rangle$ | $\langle S_i \rangle$ | $\langle v_i \rangle$ (µm/s) |
|---|---|---|---|
| Glass hydrophilic | 0.665 | 0.787 | 0.063 |
| Plastic hydrophobic | 0.837 | 0.874 | 0.114 |
| Plastic hydrophilic | 0.514 | 0.613 | 0.084 |

Values of the average shearotactic directionality $\langle S_d \rangle$, average shearotactic index $\langle S_i \rangle$ and average cell speed $\langle v_i \rangle$ for a driving signal of magnitude σ = 0.18 Pa in the presence of a 3 mM extracellular calcium concentration. The averaging process is based on a population comprising the following number of individual tracked cells for a duration of 1,200 seconds with a sampling time of 15 seconds: (i) 61 cells for the glass hydrophilic substrate, (ii) 135 for the plastic hydrophobic substrate, and (iii) 93 cells for the plastic hydrophilic substrate.

The present invention reveals two new and very important facts regarding the influence of the substrate. First, in the absence of extracellular soluble calcium, directed migration occurs with approximately the same, much reduced, speed (FIG. 2C) and very low shearotactic efficiency (FIGS. 2A & B) on both the hydrophilic and hydrophobic plastic substrates. Second, with soluble calcium levels in the range similar to those typically encountered in soil solutions (concentrations of free $Ca^{2+}$ commonly between 3.4 and 14 $mM^{42}$), the directed migration is optimal yet noticeably different for different substrates. Table 1 quantifies the differences in the shearotactic measures at a fixed extracellular calcium concentration $Ca^{2+}$=3 mM for the three substrates that were tested.

TABLE 2

| Substrate | $\langle S_d \rangle_{opt}$ | $\langle S_i \rangle_{opt}$ | $\langle v_i \rangle_{opt}$ (µm/s) |
|---|---|---|---|
| Plastic hydrophobic | 0.837 | 0.874 | 0.114 |
| Plastic hydrophilic | 0.611 | 0.642 | 0.093 |

Values of the optimal shearotactic directionality $\langle S_d \rangle$opt, optimal shearotactic index $\langle S_i \rangle$opt and optimal cell speed $\langle v_i \rangle$opt, over the very wide range of extracellular calcium concentration considered in this study, and for a driving signal of magnitude σ = 0.18 Pa. The averaging process is based on a population comprising the following number of individual tracked cells for a duration of 1,200 seconds with a sampling time of 15 seconds: 135 for the plastic hydrophobic substrate, and 121 cells for the plastic hydrophilic substrate.

Table 2 reports the differences in the optimal shearotactic measures over the wide range of calcium concentrations considered in this study—from 10 µM to 50 mM. The substantive and consistent differences in the shearotactic measures for different physicochemical substrate properties offer an effective means for discriminating such surface properties using a population of mechanosensitive and guidable cells, such as Dd and neutrophils for instance.

These results further stress the pivotal role played by extracellular calcium in relation with directed migration[8,24,40,42,43]. They also help reconcile some apparent inconsistencies in reports related to cellular migration of Dd cells over different surfaces.[8,21,24,47]

Influence of Extracellular Calcium Levels on Cell-Substrate Adhesion

Given the known relationship between adhesion and motility, and the very marked influence of extracellular calcium on directed motility over different substrates, the influence of calcium on adhesion was considered. The same wide range of soluble calcium concentrations, from 10 µM to 50 mM, is considered so as to extend previous studies[24] of shearotaxis with lower calcium levels (<1 mM) with a single type of substrate. Among the many possible ways of measuring adhesion[48], the most natural method was chosen given the focus on cellular shearotaxis, namely shear-flow detachment[46]. Specifically, the adhesion strength was indirectly quantified through the remaining fraction of cells adhering to the substrate after subjecting a given population of cells to a shear flow of magnitude $\sigma=1$ Pa for a fixed duration of 10 minutes (see above), thereby achieving the steady-state regime of the kinetics of detachment[46]. Although this approach does not yield an actual direct measurement of the adhesion strength, it provides an indirect yet precise and useful means of comparing cellular adhesion under different environmental conditions—nature of the substrate and extracellular calcium levels in the present case.

Figure 5:
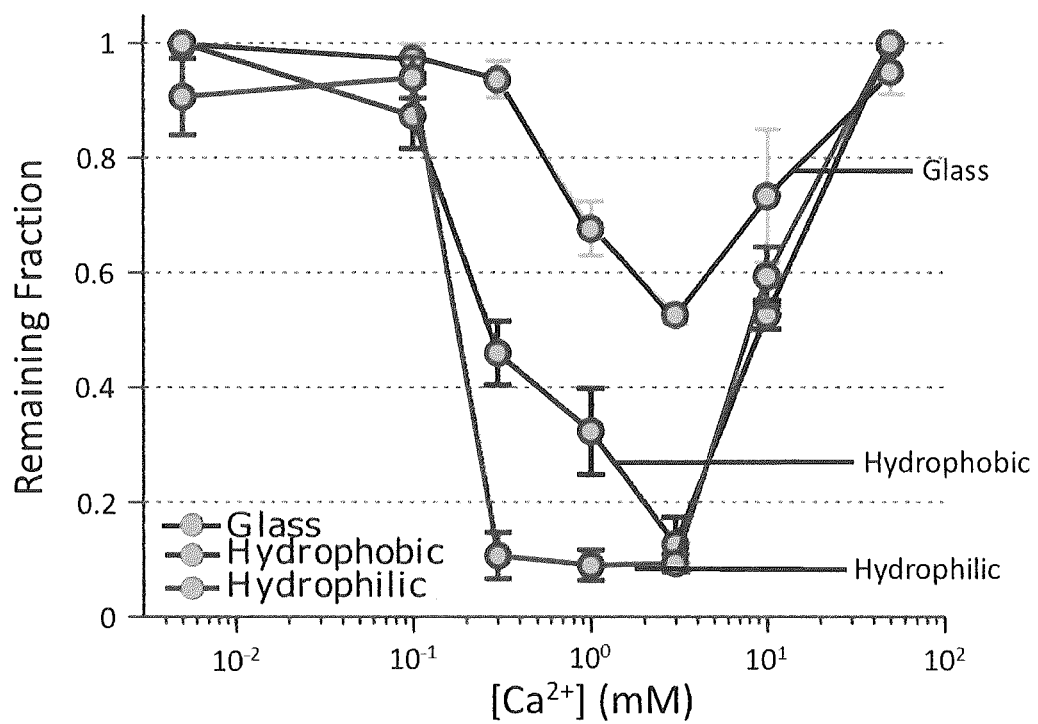
FIG. 5 is a chart showing the adhesion strength of cells on substrates at various calcium concentrations.

Interestingly, it was found that the adhesion strength is minimal for all three substrates at the calcium concentration of 3 mM (FIG. 5). This value is the one for which shearotactic motility was found to be optimal in the hydrophobic case, and close to optimal with the plastic hydrophilic substrate. To the best of our knowledge, this clear reduction of the adhesion strength in a fairly narrow range 0.5-10 mM of $[Ca^{2+}]_{ext}$ accompanied by a marked minimum, regardless of the nature of the substrate, has never been reported before for Dd. As with the earlier shearotactic motility indices, we see consistent quantitative differences in the magnitudes of the adhesion measure for different substrates, for instance, at $[Ca^{2+}]_{ext}=3$ mM, the remaining fraction of cells adhering to the glass hydrophilic substrate is over 5 times that for plastic substrates (FIG. 5). At $[Ca^{2+}]=1$ mM, the value for the hydrophobic plastic surface is over 3 times that of the hydrophilic plastic surface (FIG. 5). The results shown in FIG. 5 are notable in several ways. First, they provide yet another evidence of the biphasic effect of cell-substratum adhesion on migration speed[1]. As already mentioned, the effectiveness of the haptokinetic migration of Dd requires a fine balance between the adhesion rate at the front of the cell and the de-adhesion rate at its rear. Second, they uncover the existence of a clear relationship between directionality and adhesion. For low calcium concentrations, $[Ca^{2+}]_{ext}<0.1$ mM, and high ones, $[Ca^{2+}]_{ext}>50$ mM, the measured high levels of adhesion (FIG. 5) coincide with base-line levels of shearotactic directionality (FIG. 2A). Conversely, with calcium concentrations between 1 mM and 10 mM, reduced levels of adhesion (FIG. 5) are associated with maximum levels of $S_d$ and $S_i$ (FIG. 2A). Third, if soluble calcium concentration is not in the narrow range 0.5 mM to 10 mM, the cell-substrate adhesion strength remains elevated, irrespective of the physicochemical properties of the substrate, which was shown in FIG. 3 to impair shearotactic migration. This third point is extremely important as it reveals that calcium plays a pivotal indirect role in the active regulation of adhesion. Indeed, calcium is not known to be a chemical element directly necessary for the establishment of adhesion focal points. Lastly, the adhesion strength varies significantly for substrates with different physicochemical properties, thereby emphasizing the natural adaptive character of cellular adhesion in Dd cells. Given the recent accumulation of evidences of a calcium-based mechanosensitivity in Dd[24,40,41] we are led to suspect that the observed active regulation of adhesion associated with optimal directed migrations finds its origin in the mechanosensitive capability of the cells. The significant variability in results for cells on different substrates could therefore be associated with different mechanosensitive affinity of the cell to substrates having varying physicochemical properties.

Cell-Substrate Adhesion with Knocked Down Mechanosensation

To test the possible implication of cellular mechanosensation onto the active regulation of cell-substrate adhesion, knocking down the most effective elements of the mechanosensory apparatus, namely the MSCs[37], was considered. To achieve this, cell populations with gadolinium ($Gd^{3+}$) were treated, which is commonly used to block MSCs[49]. On Dd cells, gadolinium has already been shown to significantly impede the random migration of wild type cells[40], chemotactic migration[40], and shearotactic migration[24]. However, no report of the effects of gadolinium on cellular adhesion exists.

Figure 6:
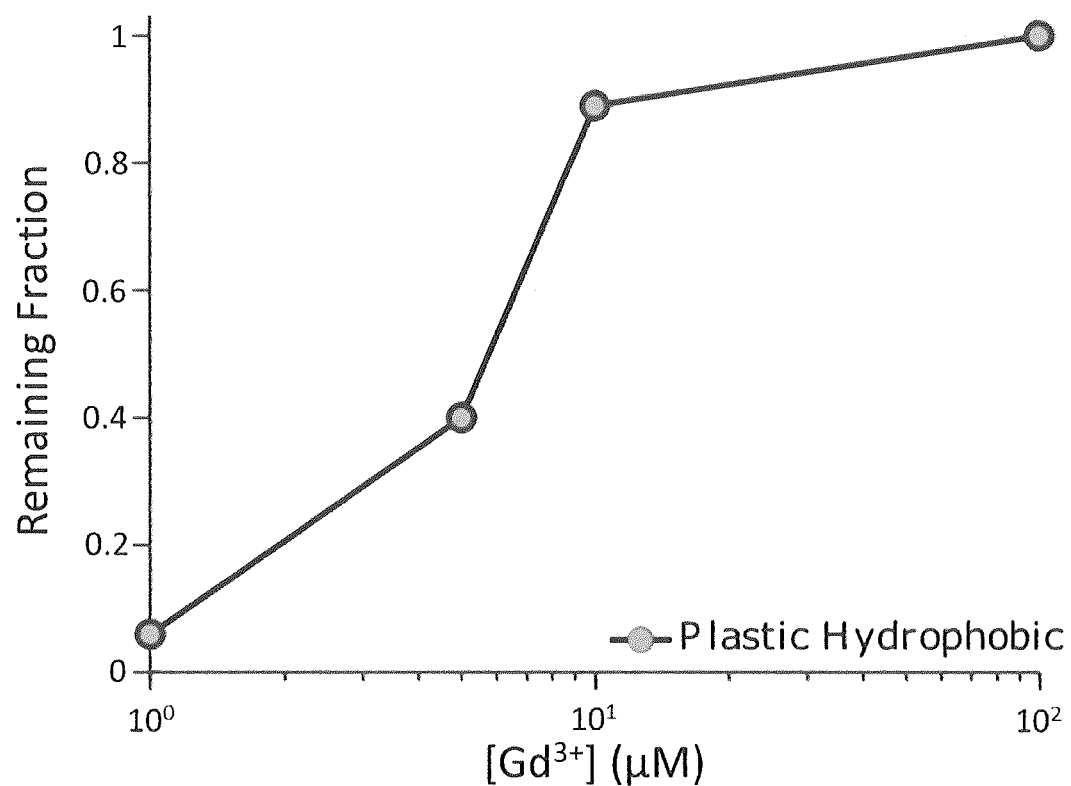
FIG. 6 is a chart showing the adhesion strength of cells on a substrate at various gadolinium ($Gd^{3+}$) concentrations.
Figure 7:
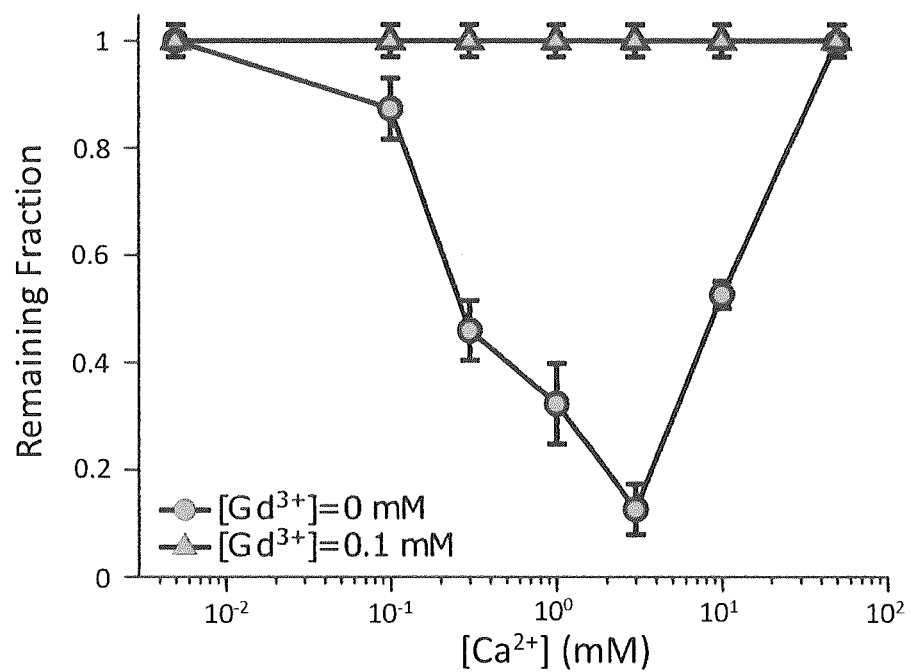
FIG. 7 is a chart showing the adhesion strength of cells on a substrate at various calcium concentrations for two extreme cases: (i) without gadolinium and (ii) in the presence of saturated gadolinium leading to the blocking of the mechanosensitive ion channels.

First, the effects of increasing the concentration of $Gd^{3+}$ on the strength of cellular adhesion were investigated—the remaining fraction is again used as a proxy for this quantity. Specifically, attention was focused on the particular case of the plastic hydrophobic substrate since it has shown to yield the most effective shearotactic migration (Table 1) and regulation of adhesion (FIG. 5) at the optimal calcium concentration of 3 mM. Results show that with increasing levels of gadolinium from $[Gd^{3+}]=1$ µM to $[Gd^{3+}]=100$ µM—corresponding to increasing inhibition of MSCs and thereby decreasing mechanosensitive capability—the strength of adhesion increases monotonously (FIG. 6). These observations thus confirm the central role played by calcium-based mechanosensitivity on the active regulation of cellular adhesion. The maximum concentration of gadolinium considered here, $[Gd^{3+}]=100$ µM, has previously been shown[24,40] to be sufficient to fully block all MSCs and therefore totally disrupt calcium-based mechanosensation. It also shows that at $[Gd^{3+}]=100$ µM, the influence of calcium levels on the strength of cellular adhesion revealed in FIG. 5 completely disappears (FIG. 7). This fact further confirms the necessity of calcium-based mechanosensation for Dd cells to effectively regulate adhesion regardless of the extracellular calcium concentration.

Shearotactic Motility with Knocked Down Mechanosensation

To close the loop on the study of the triadic coupling between motility, cell-substrate adhesion and mechanosensitivity, the effects of reduced calcium-based mechanosensation on directed motility were considered. To this aim, the concentration of gadolinium in the buffer was increased to $[Gd^{3+}]=100$ µM. Again, the focus was on the particular case of the plastic hydrophobic substrate for the same reasons as before. The shearotactic efficiency—measured by $S_d$ and $S_i$—is significantly impaired with increasing amounts of Gd$^{3+}$ (Table 3). This result could have been anticipated since: (i) such a mechanotactic behavior requires effective mechanosensation, and (ii) increasing levels of Gd$^{3+}$ have been shown to impair the active regulation of cell-substrate adhesion (FIG. 6), which is key to the effectiveness of migration.

This latter point also explains the sharp reduction in average cell speed (Table 3) with increasing amounts of gadolinium.

TABLE 3

| [Gd$^{3+}$] (μm) | $\langle \mathcal{S}_d \rangle$ | $\langle \mathcal{S}_i \rangle$ | $\langle v_i \rangle$ (μm/s) |
|---|---|---|---|
| 0 | 0.841 | 0.898 | 0.109 |
| 5 | 0.602 | 0.665 | 0.061 |
| 10 | 0.518 | 0.588 | 0.060 |
| 100 | 0.073 | 0.098 | 0.021 |

Values of the average shearotactic directionality$\langle S_d \rangle$, average shearotactic index$\langle S_i \rangle$and average cell speed$\langle v_i \rangle$ for a driving signal of magnitude σ = 0.18 Pa in the presence of a 3 mM extracellular calcium concentration for the plastic hydrophobic substrate. The averaging process is based on a population comprising at least 138 individual tracked cells for aduration of 600 seconds with a sampling time of 10 seconds.

It can be concluded that effective directed migration requires actively regulated cell-substrate adhesion, which in turn necessitates effective cellular mechanosensation.

Combined Chemotactic and Shearotactic Signaling Effects on Cell's Directional Guiding Chemotactic signaling has recently been used and reported in Ref.[7] as a means to control cell motility including complete cell trapping. Subjecting amoeboid cells to a combined chemo-shearotactic signaling has never achieved despite offering possibly unique cell control capabilities. This has been considered in the frame of the present invention using the experimental setup shown in FIG. 10. The results were obtained with cell populations containing between 150 and 200 cells, a cAMP concentration of 1 μM, and two shear stresses σ=0.2 Pa and σ=0.002 Pa, thereby generating different gradients of cAMP throughout the observation area. The results shown in FIG. 11 reveal a profound nonlinear coupling between the chemotactic signal and the shearotactical one. This nonlinear coupling offers alternative means to control amoeboid cells motility as compared to simply chemotactic or shearotactic signaling.

Figure 11B:
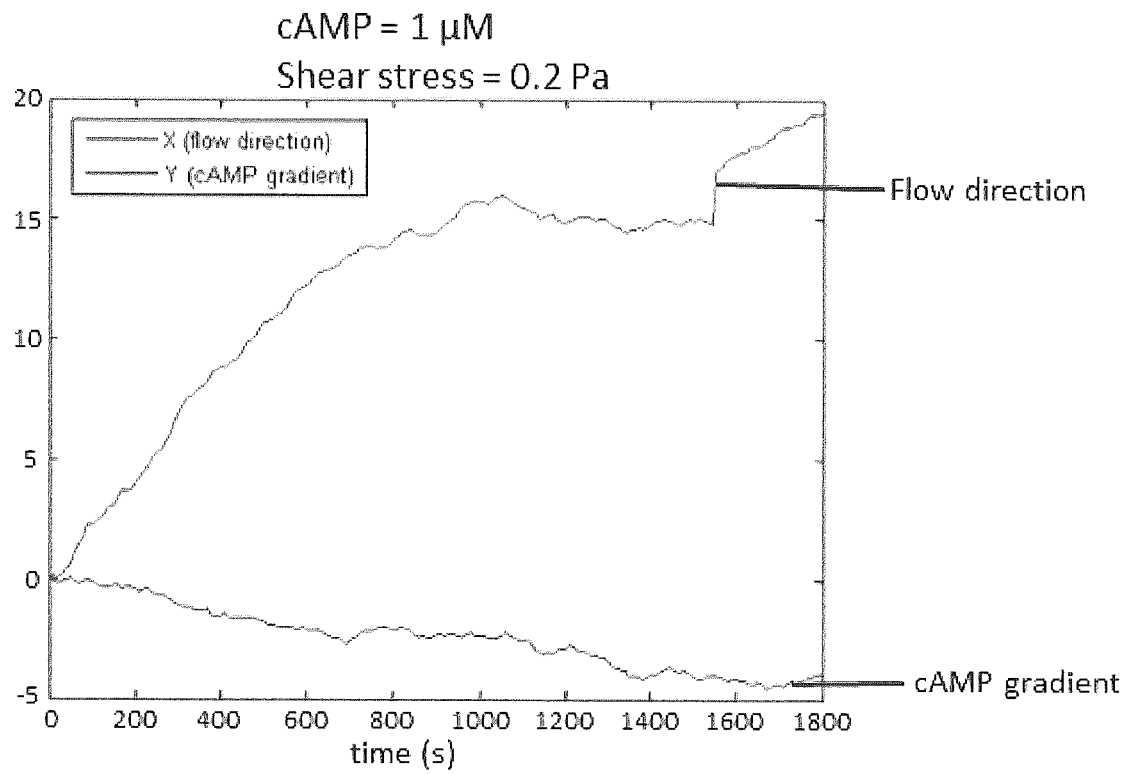

FIG. 11(a) show average cell trajectories in x and y direction respectively. Chemotactic attractant gradient is in the positive y direction. Shear stress is in the positive x direction with magnitude σ=0.002 Pa. Chemotactic stimulus guides cells to migrate in the direction of chemoattractant gradient. FIG. 11(b) show average cell trajectories in x and y direction respectively for a shearotactic signal of magnitude σ=0.2 Pa in the positive x direction. Chemotactic gradient is in the positive y direction. When shearotactic stimuli reaches the optimal value σ=0.2 Pa, chemo-competent cells migrate in the direction of the flow, while loss the ability to follow the chemoattractant gradient.

3. Conclusions

In their natural environment, *Dictyostelium* cells adhere to extracellular matrix proteins in order to translocate, while in vitro they have been shown to migrate over and adhere to plain or coated materials of varying rigidity and topography. However, many quantitative measurements of adhesive properties—kinetics of cellular detachment from the substrate or threshold shear stress for instance—and migration properties—speed and directionality— heretofore reported in the literature are not always consistent[7,8,20,21,24,44,46,48,50]. Beyond the inevitable issue of biological variability, these apparent inconsistencies are rooted in the intricate coupling between the large number of control parameters associated with: (i) the cell itself—primarily strain and growth phase, (ii) the substratum—rigidity, topography and the possible chemical coating, (iii) the fluid environment between the cell and substratum—shear stress and soluble chemicals, e.g. cAMP or extracellular calcium, and (iv) the presence or not of a driving signal of either chemical or mechanical origin. The triadic coupling among motility/adhesion/mechanosensation elucidated in this study helps substantially in reconciling these apparently inconsistent reports[7,8,20,21,24,44,46,48,50]. Specifically, with too little or too much calcium, mechanosensation is impaired leading to ineffective regulation of adhesion and thereby hindering motility. This is particularly true for experiments lacking calcium in the extracellular environment. In the absence of calcium, measures of adhesion and motility with vastly different substrates are approximately the same. Even with appropriate calcium levels, measures of adhesion and motility show clear differences for different substrate properties. This result is consistent with the fact that amoeboid cells are known to be highly adaptable to their environment and to develop effective migration capabilities over physicochemically different substrates. Our study therefore reveals the key role played by mechanosensation in the inherent adaptability to their environment of *Dictyostelium* cells.

Finally, this adaptive behavior of Dd cells to substrates having varying physicochemical properties could be used for the development of novel surface analysis methods. The essence of this method would consist of using the mechanobiological ability of cells to probe a substrate at the nanometer scale. Through quantitative measurements of adhesion and stimuli-driven motility of large populations of mechanosensitive cells, this method could provide efficacious means of discriminating between surfaces having a certain level of variations in their physical and/or chemical properties.

Whilst there has been described in the foregoing description preferred embodiments of the present invention, it will be understood by those skilled in the technology concerned that many variations or modifications in details of design or construction may be made without departing from the present invention.

REFERENCES

1. P. Friedl, S. Borgmann and E.-B. Bröcker, *J. Leukoc. Biol.*, 2001, 70, 491-509.
2. J. Renkawitz, K. Schumann, M. Weber, T. Lämmermann, H. Pflicke, M. Piel, J. Polleux, J. Spatz and M. Sixt, *Nature Cell Biol*, 2009, 11, 1438-1443.
3. C. L. Manahan, P. A. Iglesias, Y. Long and P. N. Devreotes, *Annu. Rev. Cell Dev. Biol.*, 2004, 20, 223-253.
4. H. Delanoë-Ayari, S. Iwaya, Y. T. Maeda, J. Inose, C. Rivière, M. Sano and J. Rieu, *Cell Motility and Cytoskeleton*, 2008, 65, 314-331.
5. R. H. Kessin, *Dictyostelium: evolution, cell biology, and the development of multicellularity*, Cambridge University Press, Cambridge, U.K., 2001.
6. A. Müller-Tautenberger, A. Kortholt and L. Eichinger, *Eur. J. Cell Biol.*, 2013, 92, 45-53.
7. E. DécavéD. Rieu, J. Dalous, S. Fache, Y. Bréchet, B. Fourcade, M. Satre and F. Brückert, *J. Cell Sci.*, 2003, 116, 4331-4343.
8. X. Zhu, R. Bouffanais and D. K. P. Yue, *PLoS ONE*, 2014, 9, e105406.

9. A. Makino, E. R. Prossnitz, M. Bünemann, J. M. Wang, Y. Yao and G. W. Schmid-Schönbein, *Am. J. Physiol. Cell Physiol.*, 2006, 290, C1633-C1639.
10. L. A. Smith, H. Aranda-Espinoza, J. B. Haun and D. A. Hammer, *Bio-phys. J.*, 2007, 92, 632-640.
11. G. Charras and E. Paluch, *Nature Rev. Mol. Cell Biol.*, 2008, 9, 730-736.
12. M. L. Lombardi, D. A. Knecht, M. Dembo and J. Lee, *J. Cell Sci.*, 2007, 120, 1624-1634.
13. Y. Iwadate and S. Yumura, *J. Cell Sci.*, 2008, 121, 1314-1324.
14. K. S. K. Uchida and S. Yumura, *J. Cell Sci.*, 2004, 117, 1443-1455.
15. L. Eichinger, J. A. Pachebat, G. Glockner, M. A. Rajandream, R. Sucgang and et al., *Nature*, 2005, 435, 43-57.
16. S. Cornillon, E. Pech, M. Benghezal, M. Ravanel, E. Gaynor, F. Le-Tourneur, F. Brückert and P. Cosson, *J. Biol. Chem.*, 2000, 275, 34287-34292.
17. P. Fey, S. Stephens, M. A. Titus and R. L. Chisholm, *J. Cell Biol.*, 2002, 159, 1109-1119.
18. S. Cornillon, L. Gebbie, M. Benghezal, P. Nair, S. Keller, B. Wehrle-Haller, S. J. Charette, F. Brückert, F. Letourneur and P. Cosson, *EMBO reports*, 2006, 7, 617-621.
19 S. Cornillon, R. Froquet and P. Cosson, *Eukaryot Cell*, 2008, 7, 1600-1605.
20 W. F. Loomis, D. Fuller, E. Gutierrez, A. Groisman and W.-J. Rappel, *PLoS ONE*, 2012, 7, e42033.
21 C. McCann, E. C. Rericha, C. Wang, W. Losert and C. A. Parent, *PLoS ONE*, 2014, 9, e87981.
22 P. A. Janmey and C. A. McCulloch, *Annu. Rev. Biomed. Eng.*, 2007, 9, 1-34.
23 J. Árnadóttir and M. Chalfie, *Annu. Rev. Biophys.*, 39, 111-137.
24 S. Fache, J. Dalous, M. Engelund, C. Hansen, F. Chamaraux, B. Fourcade, M. Satre, P. Devreotes and F. Brückert, *J. Cell Sci.*, 2005, 118, 3445-3457.
25 A. D. Bershadsky, N. Q. Balaban and B. Geiger, *Annu. Rev. Cell Dev. Biol.*, 2003, 19, 677-695.
26 A. Bershadsky, M. Kozlov and B. Geiger, *Curr. Opin. Cell Biol.*, 2006, 18, 472-481.
27 C. Moares, Y. Sun and C. A. Simmons, *Integr. Biol.*, 2011, 3, 959-971.
28 V. Vogel and M. Sheetz, *Nature Rev. Mol. Cell Biol.*, 2006, 7, 265-275.
29 C. M. Lo, H. B. Wang, M. Dembo and Y. L. Wang, *Biophys. J.*, 2000, 79, 144-152.
30 D. Arcizet, S. Capito, M. Gorelashvili, C. Leonhardt, M. Vollmer, S. Youssef, S. Rappl and D. Heinrich, *Soft Matter*, 2012, 8, 1473-1481.
31 M. M. Stevens and J. H. George, *Science*, 2005, 310, 1135-1138.
32 J. Wu, Z. Mao, H. Tan, L. Han, T. Ren and C. Gao, *Interface Focus*, 2012, 2, 337-355.
33 H.-D. Kim and S. R. Peyton, *Integr. Biol.*, 2012, 4, 37-52.
34 M. Singh, C. Berkland and M. S. Detamore, *Tissue Engineering: Part B*, 2008, 14, 341-366.
35 C. Moares, G. Mehta, S. C. Lesher-Perez and S. Takayama, *Annals of Biomed. Eng.*, 2012, 40, 1211-1227.
36 E. S. Place, N. D. Evans and M. M. Stevens, *Nature Materials*, 2009, 8, 457-470.
37 S. Sukharev and F. Sachs, *J. Cell Sci.*, 2012, 125, 3075-3083.
38 R. Bouffanais, J. Sun and D. K. P. Yue, *Phys. Rev. E*, 2013, 87, 052716.
39 T. Ursell, J. Kondev, D. Reeves, P. A. Wiggins and R. Phillips, *Mechanosensitive Ion Channels*, Springer-Verlag, Berlin, 2008, ch. 2, pp. 37-70.
40 M. L. Lombardi, D. A. Knecht and J. Lee, *Exp. Cell Res.*, 2008, 314, 1850-1859.
41 W. C. Lima, A. Vinet, J. Pieters and P. Cosson, *PLoS ONE*, 2014, 9, e88682.
42 D. F. Lusche, D. Wessels and D. R. Soll, *Cell Motility and Cytoskeleton*, 2009, 66, 567-587.
43 A. Scherer, S. Kuhl, D. Wessels, D. F. Lusche, B. Raisley and D. R. Soll, *J. Cell Sci.*, 2010, 23, 3756-3767.
44 J. Dalous, E. Burghardt, A. Müller-Taubenberger, F. Brückert, G. Gerisch and B. Bretschneider, *Biophys. J.*, 2008, 94, 1063-1074.
45 D. J. Watts and J. M. Ashworth, *Biochem. J.*, 1970, 119, 171-174.
46 E. Décavé, D. Garrivier, Y. Bréchet, B. Fourcade and F. Brückert, *Bio-phys. J*, 2002, 82, 2383-2395.
47 I. Weber, E. Wallraff, R. Albrecht and G. Gerisch, *J. Cell Sci.*, 1995, 108, 1519-1530.
48 F. Brückert, E. Décavé, D. Garrivier, P. Cosson, Y. Bréchet, B. Fourcade and M. Satre, *J. Muscle Res. Cell M.*, 2002, 23, 651-658.
49 X. C. Yang and F. Sachs, *Science*, 1989, 243, 1068-1071.
50 P. Rupprecht, L. Golé, J.-P. Rieu, C. Vézy, R. Ferrigno, H. C. Mertaniand C. Rivière, *Biomicrofluidics*, 2012, 6, 014107.
51 B. Meier, A. Zielinski, C. Weber, D. Arcizet, S. Youssef, et al., *Proc. Natl. Acad. Sci. USA*, 2011, 108, 11417.

The invention claimed is:

1. A microfluidic device for analyzing and controlling the motility of a cell, the device comprising:
    a first inlet for introducing a cell sample;
    a second inlet for introducing a chemoattractant, the first and second inlets converge at a junction to generate a chemotactic gradient perpendicular to the direction of the flow of the cell sample;
    an outlet for discharging the cell sample;
    a microfluidic channel in fluid communication with and intermediate the junction and outlet;
    a first pump coupled to the first inlet for pumping the cell sample in the microfluidic channel, the first pump is adapted to generate a shear stress between 0 Pa to less than or equal to 1 Pa in an observation area;
    a second pump coupled to the second inlet for generating the chemotactic gradient;
    a solution for introducing the cell sample, the solution comprising $Ca^{2+}$ with a concentration of 0.5 mM to 3 mM; and
    wherein the observation area is within a portion of the microfluidic channel for analyzing and controlling the motility of the cell in response to the chemotactical and shearotactical signals generated by the chemotactic gradient and shear stress.

2. The device according to claim 1, further comprising a third inlet for introducing the cell sample.

3. The device according to claim 1, wherein the observation area further comprising an image capturing device and a cell tracking device for live cell ensemble imaging, and wherein the cell tracking device comprises an operating programme adapted to be executed on a machine to cause the machine to analyse the motility of a cell.

4. The device according to claim 1, wherein the observation area further comprising a light source.

5. The device according to claim 1, wherein the device is optically transparent and the observation area is 1 $mm^2$.

6. The device according to claim 1, wherein the device is formed from a hydrophobic material, and wherein the device is formed from any material selected from the group comprising: plastic and glass.

7. The device according to claim 1, further comprising a plurality of microfluidic channels, each microfluidic channel comprising at least one inlet and an outlet.

8. The device according to claim 1, wherein a surface of the microfluidic channel exposed to the cell sample is a hydrophilic plastic surface.

* * * * *